US012508074B2

(12) United States Patent
Li et al.

(10) Patent No.: US 12,508,074 B2
(45) Date of Patent: Dec. 30, 2025

(54) LASER FIBER OPERATOR (71) Applicant: The First Affiliated Hospital of University of South China, Hengyang (CN)

(72) Inventors: Mingyong Li, Hengyang (CN); Wei Hu, Hengyang (CN)

(73) Assignee: THE FIRST AFFILIATED HOSPITAL OF UNIVERSITY OF SOUTH CHINA, Hengyang (CN)

( * ) Notice: Subject to any disclaimer, the term of this patent is extended or adjusted under 35 U.S.C. 154(b) by 323 days.

(21) Appl. No.: 18/547,487

(22) PCT Filed: Apr. 20, 2023

(86) PCT No.: PCT/CN2023/089431
§ 371 (c)(1),
(2) Date: Aug. 22, 2023

(87) PCT Pub. No.: WO2024/087543
PCT Pub. Date: May 2, 2024

(65) Prior Publication Data
US 2025/0009426 A1 Jan. 9, 2025

(30) Foreign Application Priority Data
Oct. 25, 2022 (CN) .......................... 202211309236.4

(51) Int. Cl.
A61B 18/20 (2006.01)
A61B 18/00 (2006.01)
(52) U.S. Cl.
CPC .. *A61B 18/201* (2013.01); *A61B 2018/00029* (2013.01); *A61B 2018/00601* (2013.01);
(Continued)

(58) Field of Classification Search
CPC ........ A61B 18/201; A61B 2018/00029; A61B 2018/00601; A61B 2218/002; A61B 2218/007; A61B 2218/008
(Continued)

(56) References Cited

U.S. PATENT DOCUMENTS 5,290,279 A * 3/1994 Bonati ................... A61B 1/317
606/7
12,303,186 B2 * 5/2025 Xu ...................... A61B 18/1402
(Continued)

FOREIGN PATENT DOCUMENTS

CN 102811669 A 12/2012
CN 114831727 A 8/2022
(Continued)

*Primary Examiner* — Ahmed M Farah
(74) *Attorney, Agent, or Firm* — MUNCY, GEISSLER, OLDS & LOWE, P.C.

(57) ABSTRACT

The present invention provides a laser fiber operator. The laser fiber operator includes a first pipe sleeve for mounting, and the first pipe sleeve is provided with a front passage for threading of an optical fiber in an axially through manner. Moreover, a first guide pipe, a second guide pipe, and a third guide pipe are axially mounted at a front end of the first pipe sleeve, and flow guide passages are formed between the guide pipes. Similarly, a second pipe sleeve and a third pipe sleeve are coaxially mounted at a rear end of the first pipe sleeve, and a flow guide passage is also formed between the second pipe sleeve and the third pipe sleeve. As the passages at the front end and the rear end of the first pipe sleeve are correspondingly connected and independently provided, effects of suction drainage and flushing drainage can be achieved according to requirements of use. Moreover, valves are disposed on the corresponding passages to achieve control over suction and flushing. An incision is rapidly and accurately flushed and cooled during cutting of a laser surgery, a field of view can be improved, and surgical (Continued)

efficiency and safety are improved. In addition, cutting, flushing and suction functions are integrated, and a surgeon can achieve the above operations with one hand, and usage is more convenient.

10 Claims, 8 Drawing Sheets

(52) U.S. Cl.
CPC ... *A61B 2218/002* (2013.01); *A61B 2218/007* (2013.01); *A61B 2218/008* (2013.01)

(58) Field of Classification Search
USPC .......................................................... 606/15
See application file for complete search history.

(56) References Cited

U.S. PATENT DOCUMENTS

| | | | | |
|---|---|---|---|---|
| 2001/0051802 A1* | 12/2001 | Woloszko | .......... | A61B 18/1482 604/35 |
| 2011/0077645 A1* | 3/2011 | Lin | .................... | A61B 18/1477 606/45 |
| 2024/0225622 A1* | 7/2024 | Guo | .................. | A61B 10/0283 |

FOREIGN PATENT DOCUMENTS

| | | |
|---|---|---|
| CN | 115590615 A | 1/2023 |
| WO | WO 2022062791 A1 | 3/2022 |

\* cited by examiner

LASER FIBER OPERATOR

FIELD OF TECHNOLOGY

The present invention relates to the field of laser surgery apparatuses, in particular to a laser fiber operator.

BACKGROUND

Because of high efficiency, accuracy and good cutting and hemostatic effects, laser may not only be used to remove skin on the body surface, lumps, etc. In recent years, it has been gradually used in laparoscopic internal organ resection surgeries, and as a new technology, it tends to replace traditional scalpels. Moreover, with the development and application of various laser fibers of different wavelengths, the scope of application of laser medicine in clinic will be more and more wide in the future.

However, at present, there is no dedicated laser fiber operator in laparoscopic surgeries, so when some doctors began to try to use laser fibers for surgical treatment in laparoscopic surgeries, they can only borrow some temporary operating rods to operate laser fibers, which are very inconvenient to use. In addition, the following problems haven been exposed:
1. Due to high energy of laser fibers, continuous cooling with water is required during a surgery to reduce the formation of eschar on a wound.
2. Based on the above, laser fibers may also produce a lot of smoke when cutting organs or human tissues, so an operation field of view is blurred and smoke needs to be discharged in time. However, due to the establishment of a pneumoperitoneum pressure in the laparoscopic surgery, if air leaks or a suction position is not accurate and timely during suction, excess air may be sucked while ensuring the purpose of suction, resulting in a sharp lack and instability of the pneumoperitoneum pressure, which affects an operating space of the surgery and interferes with the accurate operation of the surgery.
3. Based on the above, in order to achieve suction and flushing, two additional incisions had to be opened on the skin of a patient, and two laparoscopic operation trocars were added, resulting in increased surgical costs. In addition, in clinical procedures, at least one additional assistant is required to assist in the continuous injection of water for cooling during the surgery, as well as the use of an aspirator to pump blood and smoke.

Therefore, in summary, not only are the comfort and efficiency of surgical operations greatly reduced, but also the number of skin incisions and the use of surgical consumables are increased, which severely restricts the extensive application of laser surgeries.

In view of the above problems, a laser fiber operator is designed.

SUMMARY

The present invention aims to solve the technical problems that an optical fiber may not be well controlled when the laser fiber is used to perform a laparoscopic surgery, and the cutting control, flushing operation and suction operation may not be achieved by a single person during the surgery.

In order to solve the technical problems, the present invention adopts the following technical solutions: a laser fiber operator is provided. The laser fiber operator includes:

a first pipe sleeve provided with a front passage for threading of an optical fiber in an axially through manner, a first connector communicating with the front passage being provided in a side wall of the first pipe sleeve, and a second rotary valve being mounted in the first connector;

a first guide pipe, a second guide pipe, and a third guide pipe coaxially mounted at a front end of the first pipe sleeve and sequentially arranged from the outside to the inside, where a third passage is formed between the first guide pipe and the second guide pipe, a second passage is formed between the second guide pipe and the third guide pipe, an inner side of the third guide pipe is a first passage, and the first passage communicates with the front passage;

a second pipe sleeve in threaded connection to a rear end of the first pipe sleeve, a second connector being provided in a side wall of the second pipe sleeve, and a first rotary valve being mounted in the second connector;

a third pipe sleeve provided with an extension connecting pipe at a front end, a front end of the extension connecting pipe being connected to the first pipe sleeve in a sealed manner, a rear end of the extension connecting pipe being in threaded connection to a rear end of the second pipe sleeve, a first rear cavity is formed between the extension connecting pipe and the second pipe sleeve, and a second rear cavity being formed on an inner side of the extension connecting pipe, where the second passage communicates with the second rear cavity, the third passage communicates with the first rear cavity, and a position where the front passage communicates with the second rear cavity is sealed by a sealing bushing; the third pipe sleeve is provided with a third connector, and a pressing valve is mounted in the third connector; a fourth sleeve for mounting of a rear end of the optical fiber; and a fifth sleeve in threaded connection to a rear end of the third pipe sleeve, the fourth sleeve being in threaded connection to a rear end of the fifth sleeve.

Preferably, a front end of the third guide pipe protrudes from a front end of the second guide pipe, and the front end of the second guide pipe protrudes from a front end of the first guide pipe.

Preferably, through holes are provided in a circumferential wall of the front end of the first guide pipe and a circumferential wall of the front end of the third guide pipe, and the holes in the circumferential wall of the front end of the third guide pipe extend to an inner side of the second guide pipe.

Preferably, a first ring groove, a second ring groove, and a third ring groove are provided in the front end of the first pipe sleeve, and sequentially arranged from the outside to the inside in a radial direction of the first pipe sleeve, and the first guide pipe, the second guide pipe, and the third guide pipe are mounted in the corresponding ring grooves in an order from the outside to the inside.

Preferably, a fourth ring groove is provided in the rear end of the first pipe sleeve, an elastic rubber ring is disposed at a bottom of the fourth ring groove, and the extension connecting pipe is inserted in the fourth ring groove and pressed against the elastic rubber ring.

Preferably, a conical thin-wall clamping ring is disposed on a circumferential wall of the extension connecting pipe, and a plurality of open slots are provided in a wall of the clamping ring; and the operator further includes an intermediate sleeve, where the intermediate sleeve is disposed at the rear end of the extension connecting pipe in a sealed and sleeving manner from a small-diameter end of the clamping ring, the intermediate sleeve is provided with a butt joint slot, a thread is provided on an inner side of the butt joint slot, and the butt joint slot is in threaded connection to the second pipe sleeve.

Preferably, the third connector includes a first branch connector and a second branch connector, and the first branch connector and the second branch connector communicate with the second rear cavity respectively; and the pressing valve includes a first pressing valve and a second pressing valve, where the first pressing valve controls opening and closing of the first branch connector, and the second pressing valve controls opening and closing of the second branch connector.

Preferably, a mounting opening is provided in one side of the fourth sleeve, a button capable of being pushed back and forth along an axis of the fourth sleeve is mounted in the mounting opening, one end of the button is disposed on an outer side of the mounting opening, and the other end of the button is disposed on an inner side of the mounting opening and is provided with a clamping opening.

Preferably, a limiting plate is disposed on the inner side of the mounting opening and forms a slot together with an edge of the mounting opening; a wing plate is disposed on a circumferential wall of the button and inserted in the slot; an elastic sheet that is pressed against the wing plate and capable of pressing the button to rebound is disposed on an inner side of the slot; and a plurality of recesses are arranged in an edge of the inner side of the mounting opening, bumps are provided on the wing plate, and the bumps may be disposed in the recesses to position the button.

Preferably, a notch penetrating through the clamping opening is provided in an edge of an outline of the clamping opening.

The present invention has the following beneficial effects: by concentrically arranging a flushing end and a suction end around a cutting end of the optical fiber, a cut affected part can be rapidly and accurately flushed and cooled during cutting of a laser surgery; moreover, flushing liquid can be rapidly collected after flushing; and in particular, during smoke suction, smoke can be accurately and rapidly sucked before being completely spread, thereby avoiding over-suction and missing suction, ensuring steady changes of a pneumoperitoneo pressure, meanwhile, improving a field of view, and improving the surgical efficiency and safety.

In addition, cutting, flushing and suction functions are integrated, and a surgeon can achieve the above operations with one hand, and usage is more convenient. By mounting the optical fiber on the pen-like operator, the optical fiber can be taken and controlled conveniently. By means of the integrated arrangement, abdomen incisions of a patient and the use of medical tools can be reduced, injuries of the patient can be reduced, and medical costs can be reduced.

BRIEF DESCRIPTION OF THE DRAWINGS

For clearer descriptions of the technical solutions according to the embodiments of the present invention or in the prior art, drawings that are to be referred for description of the embodiments or the prior art are briefly described hereinafter. Apparently, the drawings described hereinafter merely illustrate some embodiments of the present invention, and persons of ordinary skill in the art may also derive other drawings based on the drawings described herein without any creative effort.

In the figures: 1—First pipe sleeve, 1.1—First ring groove, 1.2—Second ring groove, 1.3—Third ring groove, 1.4—Front passage, 1.5—Fourth ring groove, 1.6—First connector,
- 2—Second pipe sleeve, 2.1—Second connector.
- 3—Intermediate sleeve, 3.1—Butt joint slot,
- 4—Third pipe sleeve, 4.1—Extension connecting pipe, 4.11—Clamping ring, 4.2—First pressing valve, 4.3—Second pressing valve, 4.4—Third connector, 4.41—First branch connector, 4.42—Second branch connector,
- 5—Fourth sleeve, 5.1—Mounting opening, 5.2—Limiting plate, 5.3—Elastic sheet, 5.4—Recess,
- 6—Fifth sleeve,
- 7—Button, 7.1—Clamping opening, 7.2—Wing plate, 7.3—Bump, 7.4—Notch,
- 8—First rotary valve,
- 9—Second rotary valve,
- 10—First guide pipe,
- 11—Second guide pipe,
- 12—Third guide pipe,
- 13—Sealing bushing,
- 14—Sealing pad,
- 15—Waterproof cap,
- 16—Tail cap,
- P1—First passage,
- P2—Second passage,
- P3—Third passage,
- C1—First rear cavity,
- C2—Second rear cavity, and
- a—Optical fiber.

DESCRIPTION OF THE EMBODIMENTS

The above solutions are further described below in conjunction with specific embodiments. It should be understood that these embodiments are provided to illustrate the present invention, and are not intended to limit the scope of the present invention. The implementation conditions adopted in the embodiments may be further adjusted according to conditions of a specific manufacturer, and the implementation conditions not indicated are generally those in the routine experiment.

In one specific embodiment, a laser fiber operator is provided. The laser fiber operator specifically includes:

a first guide pipe 10, a second guide pipe 11, and a third guide pipe 12 capable of being guided into the abdominal cavity; and a first pipe sleeve 1 for mounting and fixing the three guide pipes. The first pipe sleeve 1 here is equivalent to a mounting base, and the three guide pipes are mounted at a front end thereof. Moreover, front end drainage passages, including a third passage P3, a second passage P2, and a first passage P1, are constructed between the three guide pipes.

In addition, the operator further includes a second pipe sleeve 2 and a third pipe sleeve 4 mounted at a rear end of the first pipe sleeve 1, and rear end drainage cavities, that is, a first rear cavity C1 and a second rear cavity C2, are formed between the second pipe sleeve and the third pipe sleeve. Moreover, the two cavities communicate with corresponding control valves respectively to control the amount of flushing and the amount of suction.

To achieve the flushing and suction functions, the front end drainage passages are connected to the rear end drainage cavities.

A fourth sleeve 5 and a fifth sleeve 6 are further disposed at a rear end of the operator. The fifth sleeve 6 is in threaded connection to a rear end of the third pipe sleeve 4, and the fourth sleeve 5 is in threaded or inserted connection to a rear end of the fifth sleeve 6. The fourth sleeve 5 is mainly used for mounting or fixing a rear end of an optical fiber a to ensure that a front end of the optical fiber a may be disposed along an inner side of the guide pipe and the optical fiber a is stably disposed. In addition, the fourth sleeve is used as a handle of the operator during operation, which facilitates surgical operations. The fifth sleeve 6 is mainly used for sealing a connection position of the rear end of the optical fiber a to avoid liquid leakage from a tail end of the fourth sleeve 5. A sealing pad 14 is disposed at a front end of the fifth sleeve 6, and a waterproof cap 15 is disposed at the rear end of the fifth sleeve 6. The sealing pad and the waterproof cap are only made of elastic rubber material, and the optical fiber a may penetrate through the two in a sealed manner, so it may be seen that the sealing pad 14 and the waterproof cap 15 are equivalent to double-layer sealing, thereby further improving a sealing effect. On this basis, an elastic tail cap 16 is disposed at the tail end of the fourth sleeve 5 to support the rear end of the optical fiber a and avoid damage caused by large bending of the optical fiber a.

To mount and arrange the optical fiber a, the optical fiber a in this embodiment is disposed on an operator axis and extends from a front end to a rear end. The front end is used for cutting, and the rear end is connected to a laser generator.

In summary, the specific structure and connection form of the implementation solution are as follows:

The first pipe sleeve 1 is provided with a front passage 1.4 for threading of the optical fiber a in an axially through manner. After threading of the optical fiber a, a gap is generated reserved between the optical fiber a and the front passage 1.4 to allow a flushing liquid to pass through. Therefore, in this embodiment, since the optical fiber a is closest to the front passage 1.4, the front passage 1.4 is mainly used for releasing the flushing liquid to clean and cool an incision.

In order to allow the flushing liquid to flow in, a first connector 1.6 communicating with the front passage 1.4 is provided in a side wall of the first pipe sleeve 1. Moreover, a second rotary valve 9 is mounted in the first connector 1.6 to control switching on or off of the flushing liquid and the flushing flow. The second rotary valve 9 is generally a ball valve. In this embodiment, the second rotary valve 9 may achieve a normally open and normally closed effect of a corresponding passage.

In this embodiment, the first guide pipe 10, the second guide pipe 11, and the third guide pipe 12 are coaxially mounted at the front end of the first pipe sleeve 1 and sequentially arranged from the outside to the inside. A third passage P3 is formed between the first guide pipe 10 and the second guide pipe 11, a second passage P2 is formed between the second guide pipe 11 and the third guide pipe 12, an inner side of the third guide pipe 12 is a first passage P1, and the first passage P1 communicates with the front passage 1.4 to guide the flushing liquid to cut tissues.

Figure 1:
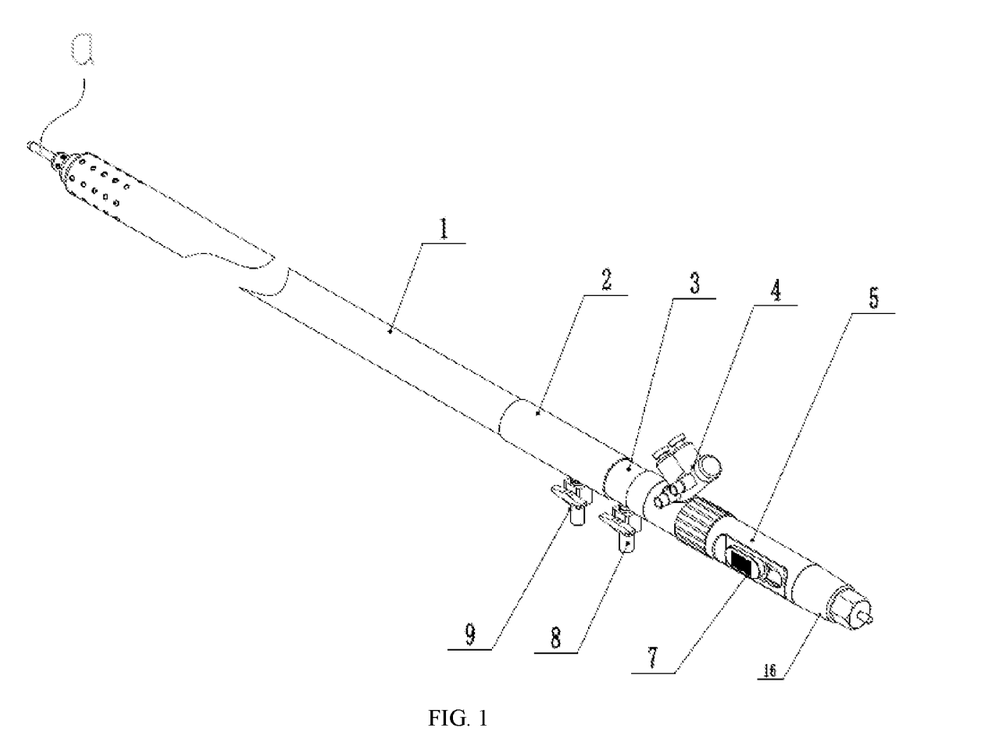
FIG. 1 is a schematic overall structure diagram of a laser fiber operator according to an embodiment of the present invention.
Figure 2:
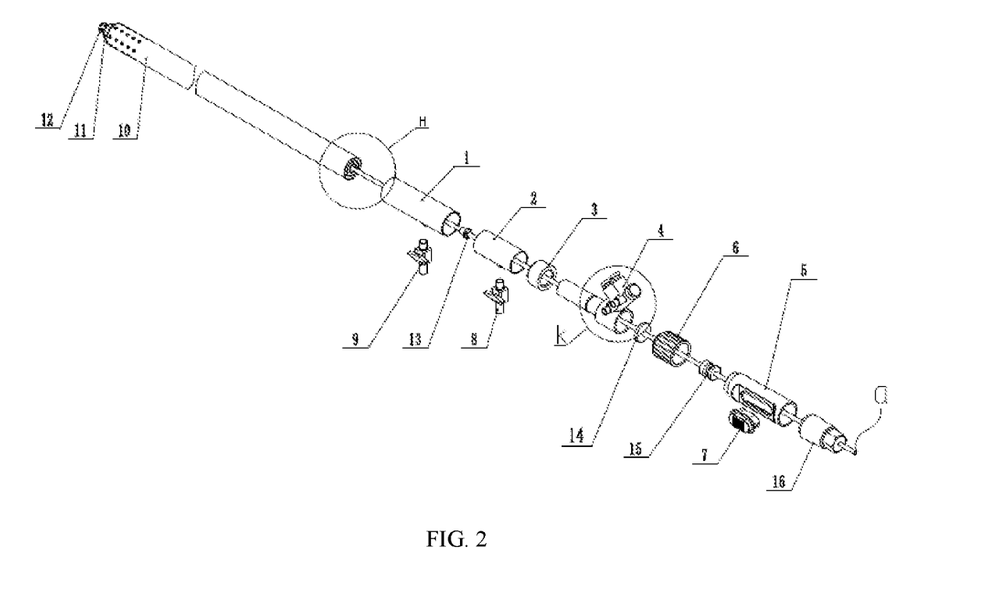
FIG. 2 is a schematic exploded view of FIG. 1.
Figure 3:
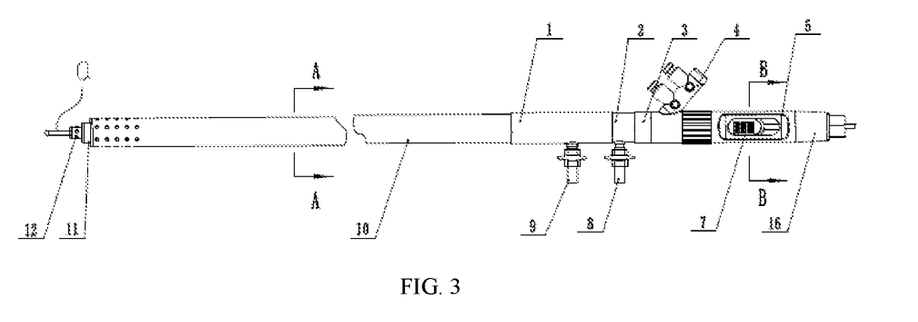
FIG. 3 is a schematic front view of FIG. 1.
Figure 4:
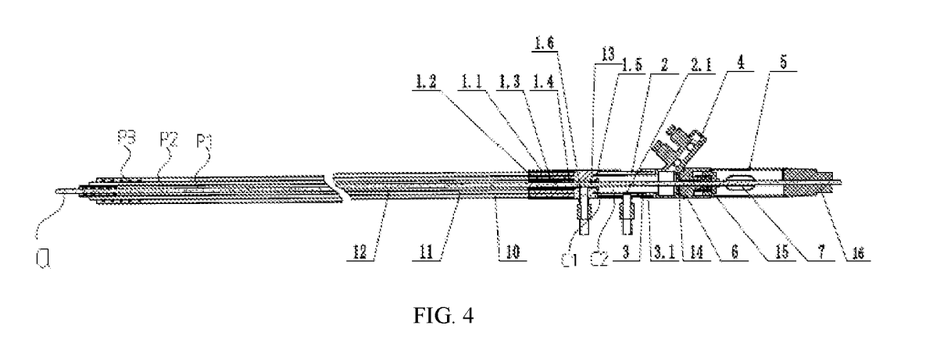
FIG. 4 is a schematic complete cross-sectional diagram of FIG. 3.
Figure 5:
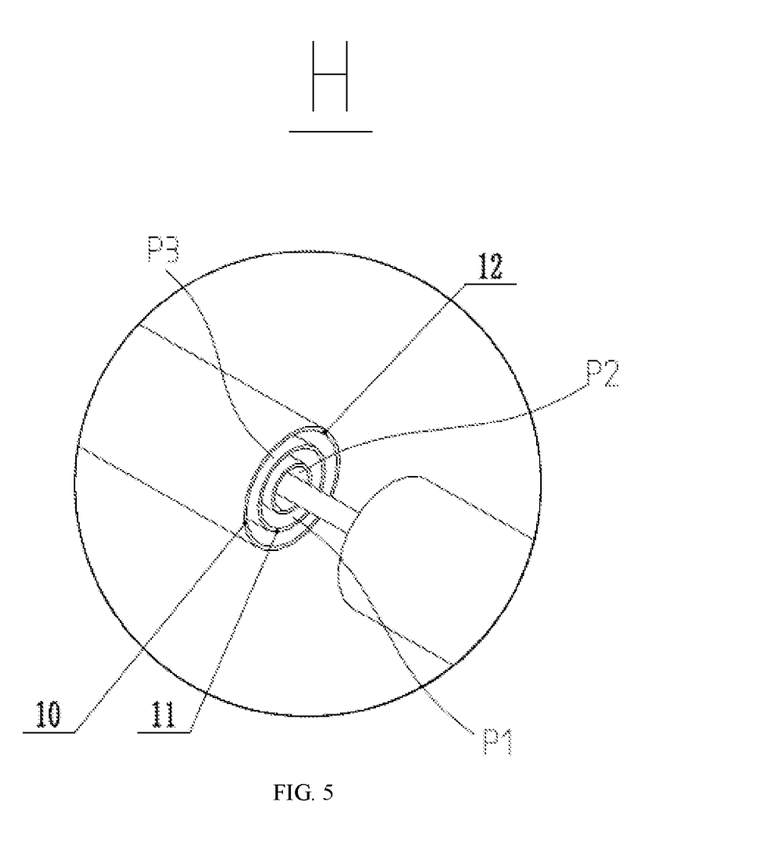
FIG. 5 is a schematic enlarged view of a position H in FIG. 2.
Figure 6:
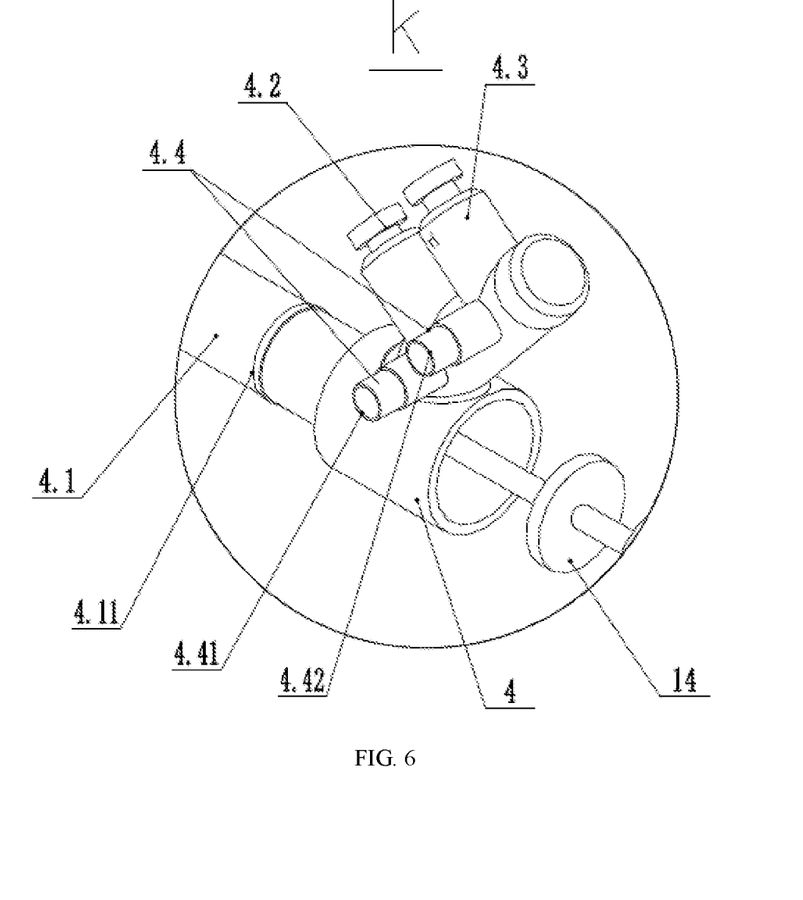
FIG. 6 is a schematic enlarged view of a position K in FIG. 2.
Figure 7:
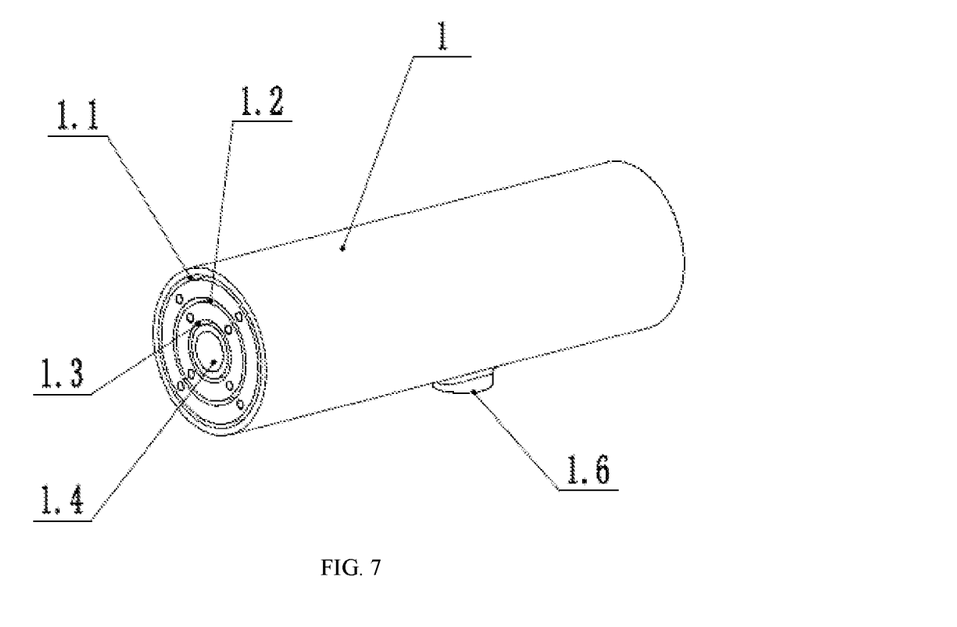
FIG. 7 is a schematic structural diagram of a front end of a first pipe sleeve according to an embodiment of the present invention.

As a preferred embodiment of the above embodiments, in order to facilitate the mounting stability and sealed connection of the guide pipes, a first ring groove 1.1, a second ring groove 1.2, and a third ring groove 1.3 are provided in the front end of the first pipe sleeve 1, and sequentially arranged from the outside to the inside in a radial direction of the first pipe sleeve 1, and the first guide pipe 10, the second guide pipe 11, and the third guide pipe 12 are mounted in the corresponding ring grooves in an order from the outside to the inside. Therefore, end portions of the guide pipes may be limited and fixed through the grooves, and specifically, should be in threaded connection or tightly inserted connection to the grooves.

In this embodiment, the third passage P3 is mainly used for smoke suction, and the second passage P2 is mainly used for flushing liquid suction.

In order to achieve rear end drainage, the specific connection structure of the rear end of the operator is as follows:

The second pipe sleeve 2 is in threaded connection to the rear end of the first pipe sleeve 1, where the threaded connection here is generally a sealed connection in order to achieve flow guidance. In addition, in order to achieve outward drainage, a second connector 2.1 is also provided in a side wall of the second pipe sleeve 2; and a first rotary valve 8 is mounted in the second connector 2.1, and may be a ball valve to achieve a normally open and normally closed effect of a corresponding passage.

In order to construct a rear end drainage cavity, the laser fiber operator further includes a third pipe sleeve 4 provided with an extension connecting pipe 4.1 at a front end. The extension connecting pipe 4.1 is mainly used for forming a sleeving structure with the second pipe sleeve 2.

For specific mounting, a front end of the extension connecting pipe 4.1 is connected to the first pipe sleeve 1 in a sealed manner, and a rear end of the extension connecting pipe 4.1 is in threaded connection to a rear end of the second pipe sleeve 2, where the threaded connection here is also a sealed threaded connection. In this way, a first rear cavity C1 for drainage is formed between the extension connecting pipe 4.1 and the second pipe sleeve 2, and a second rear cavity C2 is formed on an inner side of the extension connecting pipe 4.1. The first rear cavity and the second rear cavity are non-connected and independent cavities, thereby forming drainage passages respectively to facilitate drainage control.

Figure 8:
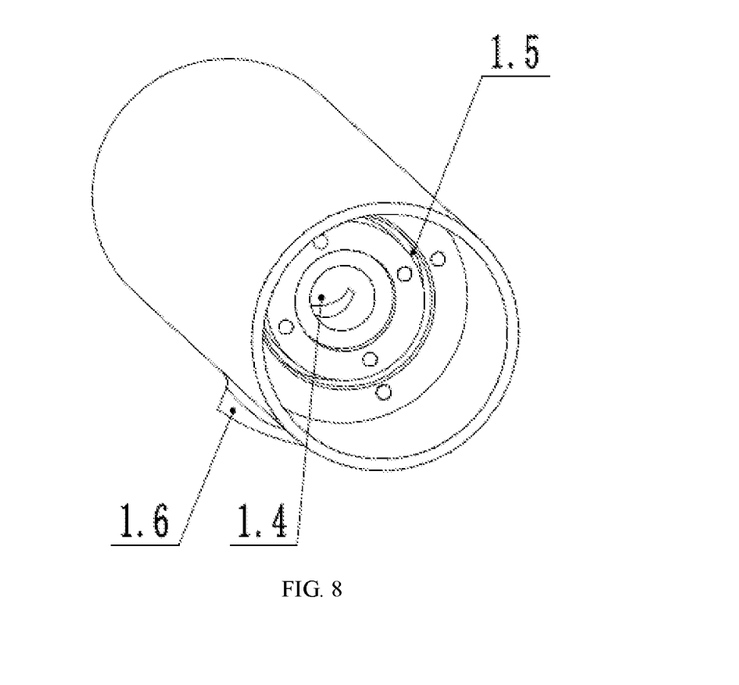
FIG. 8 is a schematic structural diagram of a rear end of FIG. 7.
Figure 9:
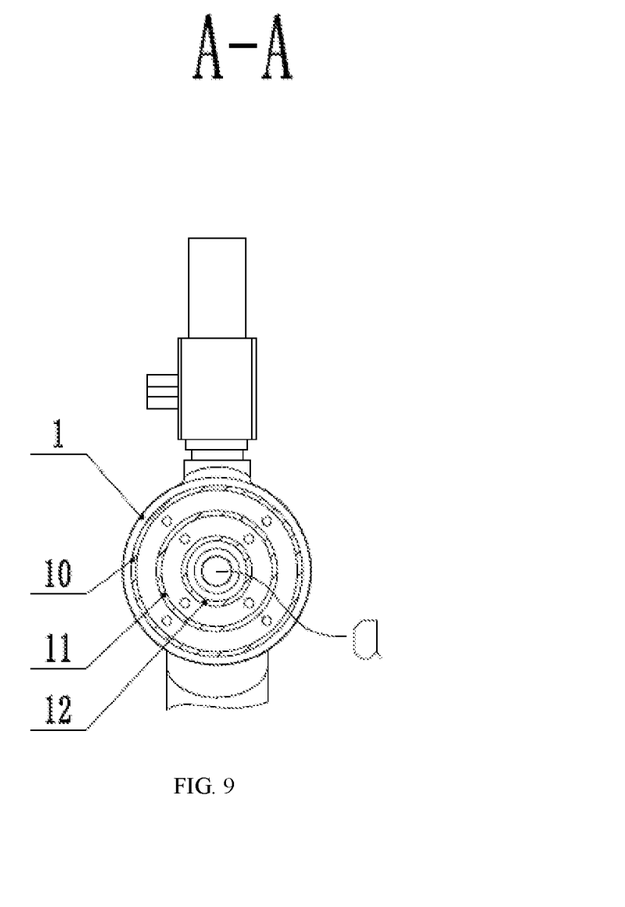
FIG. 9 is a schematic cross-sectional diagram of a position A-A in FIG. 3.
Figure 10:
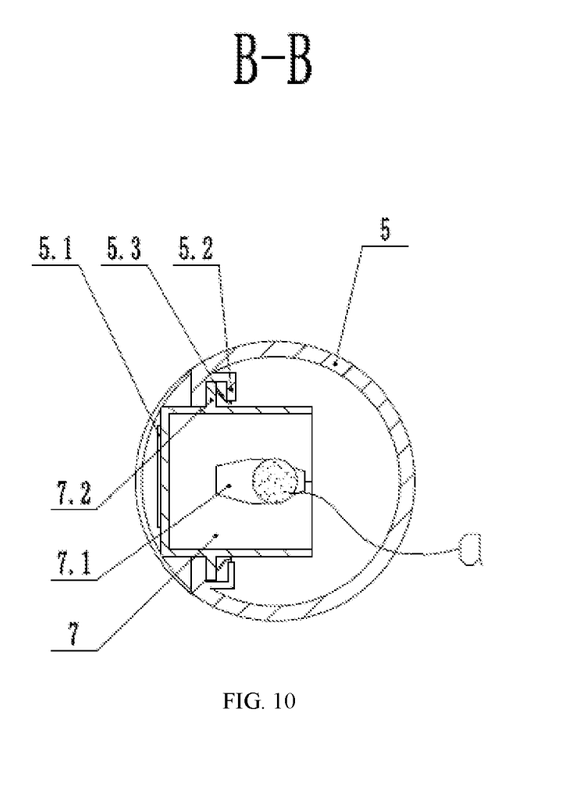
FIG. 10 is a schematic cross-sectional diagram of a position B-B in FIG. 3.

As a preferred embodiment of the above embodiments, in order to position the extension connecting pipe 4.1 and achieve a sealed connection with the rear end of the first pipe sleeve 1, a fourth ring groove 1.5 is provided in the rear end of the first pipe sleeve 1, and an elastic rubber ring is disposed at a bottom of the fourth ring groove. After being mounted, the extension connecting pipe 4.1 is inserted in the fourth ring groove 1.5 and pressed against the elastic rubber ring to achieve end sealing.

As a preferred solution of this embodiment, it may be seen from the above that the rear end of the first pipe sleeve 1 is in threaded connection to the second pipe sleeve 2, and the rear end of the extension connecting pipe 4.1 is in threaded connection to the rear end of the second pipe sleeve 2. Since the first pipe sleeve 1 adopts the threaded connection, an intermediate sleeve 3 is adopted to ensure the mounting positions of the first rotary valve 8 and the third connector 4.4 and ensure that threads meet the sealing requirements during mounting, thereby avoiding synchronous rotation of the second pipe sleeve 2 and the extension connecting pipe 4.1 during screwing. The specific structure is as follows:

A conical thin-wall clamping ring 4.11 is disposed on a circumferential wall of the extension connecting pipe 4.1, and a plurality of open slots are provided in a wall of the clamping ring. As the thin-wall clamping ring 4.11 is compressed and the open slots are deformed, the intermediate sleeve 3 is disposed at the rear end of the extension connecting pipe 4.1 in a sealed and sleeving manner from a small-diameter end of the clamping ring 4.11. The sealing here generally refers to that a sealing ring is disposed inside the intermediate sleeve 3, and the sealing ring may achieve a moving sealed connection to the extension connecting pipe 4.1. The intermediate sleeve 3 is provided with a butt joint slot 3.1, a thread is provided on an inner side of the butt joint slot, and the butt joint slot is in threaded connection to the second pipe sleeve 2. Therefore, the rotation of the extension connecting pipe 4.1 is avoided, and the extension connecting pipe 4.1 is pushed to move through rotation of the intermediate sleeve 3, thereby improving the usage convenience.

A connection method for the front end drainage and the rear end drainage is: the second passage P2 communicates with the second rear cavity C2, and the third passage P3 communicates with the first rear cavity C1.

In addition, according to the above, since the front passage 1.4 is mainly a flushing passage, in order to avoid the flushing liquid entering the second rear cavity C2, a position where the front passage 1.4 communicates with the second rear cavity C2 is sealed with a sealing bushing 13. In this embodiment, in order to enable the optical fiber a to pass through in a sealed manner, the sealing bushing 13 is generally made of rubber material, and the optical fiber a may penetrate through the sealing bushing 13 in a sealed and slidable manner. Specifically, a plurality of sealing rings may be disposed on an inner side of a hole matching the optical fiber a, and the sealing ring is connected to an outer wall of the optical fiber a, which belongs to existing movable sealing forms, such as stem seal, which will not be described here.

Similarly, in order to achieve the outward conduction of the second rear cavity C2, a third connector 4.4 is provided in the third pipe sleeve 4, and a pressing valve is mounted in the third connector 4.4. The pressing valve generally refers to a valve that is opened and closed by pressing, and belongs to an inching control valve. During use, the valve may be controlled to be opened and closed by finger pressing, so as to achieve intermittent suction and improve the usage convenience.

In addition, the second passage P2 may also be used as a flushing passage. During use, the flushing liquid may be discharged from through holes in a circumferential wall of the front end of the third guide pipe 12 for auxiliary flushing, and intermittent cleaning may be achieved combined with the control of the pressing valve, thereby improving the usage convenience.

As a preferred embodiment, in order to select the suction or flushing function of the second passage P2, the third connector 4.4 includes a first branch connector 4.41 and a second branch connector 4.42, and the first branch connector and the second branch connector communicate with the second rear cavity C2 respectively. In order to achieve the intermittent control of suction or flushing of the second passage P2, two pressing valves, that is, a first pressing valve 4.2 and a second pressing valve 4.3, are adopted for control. The first pressing valve 4.2 controls opening and closing of the first branch connector 4.41, and the second pressing valve 4.3 controls opening and closing of the second branch connector 4.42. Therefore, during use, different flushing pumps or aspirators are correspondingly connected to the first branch connector 4.41 and the second branch connector 4.42.

For specific clinical use, the valves are firstly connected to external apparatuses, that is, connected to a corresponding abdominal pressure aspirator and a water supply pump; and the optical fiber a is then inserted from the rear end of the operator and extends to the front end of the operator for tissue cutting. During use, the first guide pipe 10, the second guide pipe 11, and the third guide pipe 12 enter the abdominal cavity through the passages established in the abdominal cavity, a cutting end of the optical fiber a reaches an affected part under a visual guidance of an endoscope, and carries out cutting, meanwhile, the second rotary valve 9 is opened to supply the flushing liquid, and the flushing liquid is introduced into the front end of the optical fiber a through the first passage P1 for washing and cooling. Since smoke may be produced during cutting, in this case, the first rotary valve 8 may be opened, then the third passage P3 may continuously produce a small negative pressure, and the smoke is sucked under the situation that a stable pneumoperitoneum pressure is ensured. In addition, when the flushing liquid needs to be sucked, the flushing liquid may enter the second passage P2 by controlling the pressing valve to be collected.

Therefore, it may be seen that cutting, flushing, liquid suction, and smoke suction are arranged on the same operator, and a single surgeon may achieve the above operations with one hand. By mounting the optical fiber a on the pen-like operator, the optical fiber may be taken and controlled conveniently.

In this solution, the third passage P3 and the second passage P2 generally have small cross sections, which may avoid a rapid drop of a pneumoperitoneum pressure during suction.

In addition, it may be seen that since a flushing end and a suction end are both disposed around the cutting position of the optical fiber a, flushing and suction may be achieved rapidly and efficiently. In particular, during smoke suction, the smoke may be accurately and rapidly sucked before being completely spread, thereby avoiding over-suction and missing suction, ensuring steady changes of the pneumoperitoneo pressure, improving a visual effect, and improving the surgical efficiency and safety.

In addition, cutting, flushing and suction functions are integrated, which may reduce abdomen incisions of a patient and the use of medical tools, reduce injuries of the patient, and reduce medical costs.

In view of the above implementation solutions, during a surgery, in order to further improve a surgical field of view and enable the surgeon to observe the position of the optical fiber a conveniently, the front end of the third guide pipe 12 protrudes from a front end of the second guide pipe 11, and the front end of the second guide pipe 11 protrudes from a front end of the first guide pipe 10. That is, a front end step form of the operator is formed. In this way, the first guide pipe 10 and the second guide pipe 11 may reduce blocking of the optical fiber a, thereby improving the cutting accuracy and further improving the surgical safety.

In order to further improve the suction and flushing efficiency and scope, through holes are provided in a circumferential wall of the front end of the first guide pipe 10 and a circumferential wall of the front end of the third guide pipe 12. The through holes in the circumferential wall of the front end of the third guide pipe 12 extend to an inner side of the second guide pipe 11.

During specific use, since the first guide pipe 10 is the main smoke suction passage, spreading smoke may enter the first guide pipe via the through holes in the circumferential wall of the front end, thereby improving the suction efficiency. In addition, since the front end of the third guide pipe 12 is the most protruding, when the second passage P2 is used for suction, suction may be achieved through the through holes in the circumferential wall of the front end of the third guide pipe 12, thereby improving the suction efficiency and avoiding large blood clots entering the second passage P2 to a certain extent.

Figure 11:
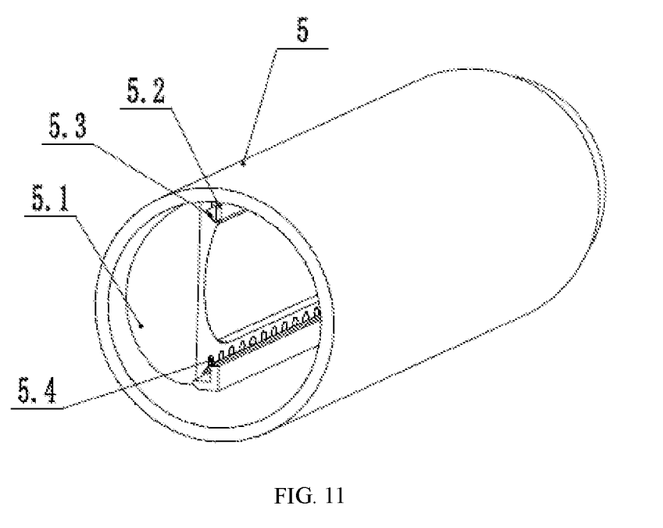
FIG. 11 is a schematic structural diagram of a fourth sleeve according to an embodiment of the present invention.
Figure 12:
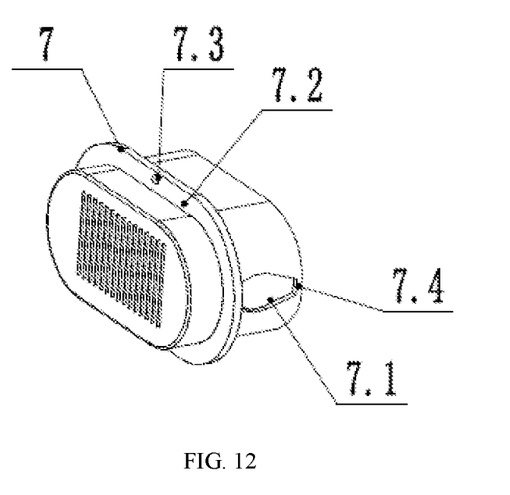
FIG. 12 is a schematic structural diagram of a button according to an embodiment of the present invention.

In view of the above solutions, in order to control extension and retraction of the optical fiber a during surgical operations to adapt to cutting at different positions, a mechanism for controlling the movement of the optical fiber a is disposed at the fourth sleeve 5, specifically as follows:

a mounting opening 5.1 is provided in one side of the fourth sleeve 5, and a button 7 capable of being pushed back and forth along an axis of the fourth sleeve 5 is mounted in the mounting opening 5.1. One end of the button is disposed on an outer side of the mounting opening 5.1, and the other end of the button is disposed on an inner side of the mounting opening and is provided with a clamping opening 7.1. The clamping opening 7.1 may clamp the optical fiber a. Thus, the front end of the optical fiber a may extend and retract by pushing the button 7 during use. Similarly, in order to achieve a sliding connection between the fourth sleeve 5 and the optical fiber a, a sealing pad 14 is mounted at the front end of the fourth sleeve 5, and the optical fiber a is inserted in the sealing pad 14 in a sealed and slidable manner. On this basis, in order to further position the optical fiber a and avoid movement during cutting, a limiting plate 5.2 is disposed on the inner side of the mounting opening 5.1, and forms a slot together with an edge of the mounting opening 5.1. In addition, a wing plate 7.2 is disposed on a circumferential wall of the button 7 and inserted into the slot. Moreover, an elastic sheet 5.3 that is pressed against the wing plate 7.2 and capable of pressing the button 7 to rebound is disposed on an inner side of the slot.

In addition, a plurality of recesses 5.4 are arranged in an edge of the inner side of the mounting opening 5.1. Meanwhile, bumps 7.3 are provided on the wing plate 7.2, and the bumps 7.3 may be disposed in the recesses 5.4 to position of the button 7. During specific use, the bumps 7.3 are separated from the recesses 5.4 by pressing the button 7, so that the button 7 may slide front and back in the mounting opening 5.1, and then drive the optical fiber a to extend and retract. After the position of the cutting end of the optical fiber a is determined, the button 7 is released, the bumps 7.3 are matched with the recesses 5.4 due to an elastic force of the elastic sheet 5.3 so as to limit the button 7, thereby positioning the optical fiber a.

In view of the above, in order to better clamp the optical fiber a, a notch 7.4 penetrating through the clamping opening 7.1 is provided in an edge of an outline of the clamping opening 7.1, and the clamping opening 7.1 produces elasticity by means of the notch 7.4. During mounting, by opening the notch 7.4, the optical fiber a smoothly penetrates into the clamping opening 7.1. After a clamping position is determined, the notch 7.4 is released, and then the clamping opening 7.1 clamps the optical fiber a, so that the mounting convenience may be improved.

The above description is based on preferred embodiments of the present invention. By means of the above described contents, the staff concerned is fully capable of making diverse changes as well as modifications within the scope of the technical ideas of the present invention. The technical scope of the present invention is not limited to the contents of the specification, but must be determined in accordance with the scope of the claims.

What is claimed is:

1. A laser fiber operator, characterized by comprising:
   a first pipe sleeve (1) provided with a front passage (1.4) for threading of an optical fiber (a) in an axially through manner, a first connector (1.6) communicating with the front passage (1.4) being provided in a side wall of the first pipe sleeve (1), and a second rotary valve (9) being mounted in the first connector (1.6);
   a first guide pipe (10), a second guide pipe (11), and a third guide pipe (12) coaxially mounted at a front end of the first pipe sleeve (1) and sequentially arranged from the outside to the inside, so that a third passage (P3) is formed between the first guide pipe (10) and the second guide pipe (11), a second passage (P2) is formed between the second guide pipe (11) and the third guide pipe (12), an inner side of the third guide pipe (12) is a first passage (P1), and the first passage (P1) communicates with the front passage (1.4);
   a second pipe sleeve (2) in threaded connection to a rear end of the first pipe sleeve (1), a second connector (2.1) being provided in a side wall of the second pipe sleeve (2), and a first rotary valve (8) being mounted in the second connector (2.1);
   a third pipe sleeve (4) provided with an extension connecting pipe (4.1) at a front end, a front end of the extension connecting pipe being connected to the first pipe sleeve (1) in a sealed manner, a rear end of the extension connecting pipe (4.1) being in threaded connection to a rear end of the second pipe sleeve (2) to form a first rear cavity (C1) between the extension connecting pipe (4.1) and the second pipe sleeve (2), and a second rear cavity (C2) being formed on an inner side of the extension connecting pipe (4.1), wherein the second passage (P2) communicates with the second rear cavity (C2), the third passage (P3) communicates with the first rear cavity (C1), and a position where the front passage (1.4) communicates with the second rear cavity (C2) is sealed by a sealing bushing (13); the third pipe sleeve (4) is provided with a third connector (4.4), and a pressing valve is mounted in the third connector (4.4);
   a fourth sleeve (5) for mounting of a rear end of the optical fiber (a); and
   a fifth sleeve (6) in threaded connection to a rear end of the third pipe sleeve (4), the fourth sleeve (5) being in threaded connection to a rear end of the fifth sleeve (6).

2. The laser fiber operator according to claim 1, characterized in that a front end of the third guide pipe (12) protrudes from a front end of the second guide pipe (11), and the front end of the second guide pipe (11) protrudes from a front end of the first guide pipe (10).

3. The laser fiber operator according to claim 2, characterized in that through holes are provided in a circumferential wall of the front end of the first guide pipe (10) and a circumferential wall of the front end of the third guide pipe (12), and the holes in the circumferential wall of the front end of the third guide pipe (12) extend to an inner side of the second guide pipe (11).

4. The laser fiber operator according to claim 1, characterized in that a first ring groove (1.1), a second ring groove (1.2), and a third ring groove (1.3) are provided in the front end of the first pipe sleeve (1), and sequentially arranged from the outside to the inside in a radial direction of the first pipe sleeve (1), and the first guide pipe (10), the second guide pipe (11), and the third guide pipe (12) are mounted in the corresponding ring grooves in an order from the outside to the inside.

5. The laser fiber operator according to claim 1, characterized in that a fourth ring groove (1.5) is provided in the rear end of the first pipe sleeve (1), an elastic rubber ring is disposed at a bottom of the fourth ring groove, and the extension connecting pipe (4.1) is inserted in the fourth ring groove (1.5) and pressed against the elastic rubber ring.

6. The laser fiber operator according to claim 5, characterized in that a conical thin-walled clamping ring (4.11) is disposed on a circumferential wall of the extension connecting pipe (4.1), and a plurality of open slots are provided in a wall of the clamping ring; and the operator further comprises an intermediate sleeve (3), wherein the intermediate sleeve (3) is disposed at the rear end of the extension connecting pipe (4.1) in a sealed and sleeving manner from a small-diameter end of the clamping ring (4.11), the intermediate sleeve (3) is provided with a butt joint slot (3.1), a thread is provided on an inner side of the butt joint slot, and the butt joint slot is in threaded connection to the second pipe sleeve (2).

7. The laser fiber operator according to claim 1, characterized in that the third connector (4.4) comprises a first branch connector (4.41) and a second branch connector (4.42), and the first branch connector and the second branch connector communicate with the second rear cavity (C2) respectively; and the pressing valve comprises a first pressing valve (4.2) and a second pressing valve (4.3), wherein the first pressing valve (4.2) controls opening and closing of the first branch connector (4.41), and the second pressing valve (4.3) controls opening and closing of the second branch connector (4.42).

8. The laser fiber operator according to claim 1, characterized in that a mounting opening (5.1) is provided in one side of the fourth sleeve (5), a button (7) capable of being pushed back and forth along an axis of the fourth sleeve (5) is mounted in the mounting opening (5.1), one end of the button is disposed on an outer side of the mounting opening (5.1), and the other end of the button is disposed on an inner side of the mounting opening and is provided with a clamping opening (7.1).

9. The laser fiber operator according to claim 8, characterized in that a limiting plate (5.2) is disposed on the inner side of the mounting opening (5.1) and forms a slot together with an edge of the mounting opening (5.1);

a wing plate (7.2) is disposed on a circumferential wall of the button (7) and inserted in the slot; an elastic sheet (5.3) that is pressed against the wing plate (7.2) and capable of pressing the button (7) to rebound is disposed on an inner side of the slot; and a plurality of recesses (5.4) are arranged in an edge of the inner side of the mounting opening (5.1), bumps (7.3) are provided on the wing plate (7.2), and the bumps (7.3) may be disposed in the recesses (5.4) to position the button (7).

10. The laser fiber operator according to claim 8, characterized in that a notch (7.4) penetrating through the clamping opening (7.1) is provided in an edge of an outline of the clamping opening (7.1).

* * * * *